United States Patent [19]

Waldmann

[11] Patent Number: 5,659,011

[45] Date of Patent: Aug. 19, 1997

[54] AGENTS HAVING HIGH NITROGEN CONTENT AND HIGH CATIONIC CHARGE BASED ON DICYANIMIDE DICYANDIAMIDE OR GUANIDINE AND INORGANIC AMMONIUM SALTS

[76] Inventor: John J. Waldmann, 2129 Knickerbocker Dr., Charlotte, N.C. 28212

[21] Appl. No.: 310,066

[22] Filed: Sep. 23, 1994

[51] Int. Cl.$^6$ ........................................ A23J 1/00
[52] U.S. Cl. ................................ 528/422; 521/30
[58] Field of Search ........................ 528/422, 423; 521/30

[56] References Cited

U.S. PATENT DOCUMENTS 4,764,585  8/1988  Heller et al. ........................ 528/237
5,135,613  8/1992  Waldman ............................ 162/199

FOREIGN PATENT DOCUMENTS 57-106782  7/1982  Japan .
62-033893  2/1987  Japan .

*Primary Examiner*—Morton Foelak
*Attorney, Agent, or Firm*—Isaac A. Angres; Susan P. Petrglia

[57] ABSTRACT

The present invention describes polymers having high nitrogen content and high cationic charges derived from dicyanimide, dicyandiamide or guanidine and inorganic ammonium salts. The new compositions are useful in the pulp and paper industries as pitch control agents, as well as adjuvants such as in felt cleaner applications. The new materials are also useful in paper sizing, as retention aids, as antistatic agents, and as coagulants and flocculating agents.

16 Claims, No Drawings

AGENTS HAVING HIGH NITROGEN CONTENT AND HIGH CATIONIC CHARGE BASED ON DICYANIMIDE DICYANDIAMIDE OR GUANIDINE AND INORGANIC AMMONIUM SALTS

BACKGROUND OF THE INVENTION

The present invention relates to compositions of matter which are useful in chemical, pulp and paper, mining, clay, textile and leather industries. The polymers and (co) polymers of the present invention can be used in pulp and paper industries as pitch control agents, as chemical additives and adjuvants such as felt cleaner, as tack reducing agents on paper machines, as paper sizings, as retention aids, additives for colorants, and as antistatic agents. The inventive materials are also useful as flame retardants in flame retardant formulations, as dispersing agents, as antimicrobials, as coagulants and as flocculating agents. Further still, the novel polymers and copolymers described herein are useful in compositions with sequestering agents.

The present invention further relates to linear and/or cyclic guanidine or polyguanidine or (co)polyguanidine, dicyandiamide polyguanidine ammonium chloride (PGAC) or polyguanidine urea ammonium chloride (PGUAC) which are further reacted with cationic charged or multiply cationic charged reactive agents of the non-formaldehyde type.

Such products having cationic or multiple cationic charge are disclosed, for example, in U.S. Pat. Nos. 4,891,422 and 4,902,779 (now Re 34,486), and in 5,135,613, these disclosures being fully incorporated herein by reference. U.S. Pat. No. Re 34,486 describes cationic polyguanidine and its alloy-type formation by condensation according to the following reaction:

Dicyandiamide + Formaldehyde + Ammonium chloride ($C_2H_4N_4$)   ($CH_2O$)   ($NH_4Cl$)

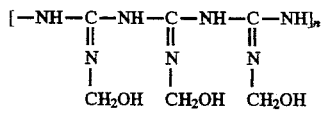

$$[-NH-\underset{\underset{CH_2OH}{\underset{|}{N}}}{\overset{\|}{C}}-NH-\underset{\underset{CH_2OH}{\underset{|}{N}}}{\overset{\|}{C}}-NH-\underset{\underset{CH_2OH}{\underset{|}{N}}}{\overset{\|}{C}}-NH]_n$$

(PGAC)

Alkylamine ($C_1$–$C_{12}$) or optionally hydroxyalkylamine, and urea are reacted to form a regular polyguanidine chain of the uncharged type as represented by the general structure:

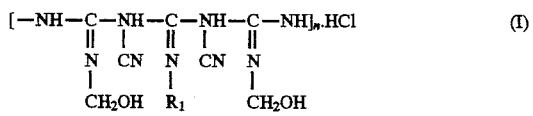

$$[-NH-\underset{\underset{CH_2OH}{\underset{|}{\underset{N}{\|}}}}{C}-\underset{\underset{R_1}{|}}{NH}-\underset{\underset{\underset{N}{\|}}{\underset{|}{CN}}}{C}-NH-\underset{\underset{CH_2OH}{\underset{|}{\underset{N}{\|}}}}{C}-NH]_n \cdot HCl \quad (I)$$

where n is less than 100,000. The (co)polyguanidines are defined by the formulae B(1), B(3), B(4), B(5), B(6), B(7) as disclosed in Re 34,486, and are further reacted with cationic or multiply cationic charged agents defined by formula B(2) and agents (a, b, c, d, e, f, g, h, i) also disclosed therein. The $R_1$ and $R_2$ moieties are well defined in U.S. Pat. No. Re 34,486 and its contents are fully incorporated herein by reference.

The guanidines or polyguanidines of structural formula (I) according to Re 34,486 differ from those of the present invention. The reaction of dicyandiamide with alkyl amine proceeds via a condensation process to form an inert (i.e., uncharged or non-cationic) guanidine or polyguanidine with high insoluble matter and is well known. For example, these products are described in:

German Patent No. 851,001, Ger. Offen. DE 3,400,051, U.S. Pat. Nos. 2,649,354; 3,873,266; 3,488,742; 4,410,652; 4,439,303; 4,439,208; and in Fr. Demande FR 2 567 897.

French patent 2,567,897 and the references cited therein describe condensation products for fixing, dyeing, and printing, and which are prepared by catalytic condensation of alkyl amine with dicyandiamide in the presence of a zinc chloride catalyst (optionally containing less than 50 mol % dicarboxylic acid or its ester and also aminoplasts, epihalohydrins and/or formaldehyde or its donors). However, the use of zinc in the condensation process poses environmental concerns such as restrictions regarding the disposal of waste zinc which is a known water pollutant.

U.S. Pat. No. 3,873,266 and 2,649,354 disclose that these condensation products from diethylenetriamine and dicyandiamide are not homogeneous, are very difficult to handle, and are not completely water soluble. The '266 patent describes the process of making a solution from condensation products of (A) polyamines and (B) cyanamides, or their water soluble salts. These processes, however, require long reaction time and are very unpractical on an industrial scale.

U.S. Pat. No. 4,410,652, incorporated herein by reference, describes the use of the reaction product from an amine with cyanamide, dicyandiamide, guanidine or biguanidine as a wet fastness agent for direct dyes on cellulose substrates. The '652 patent describes an in condensation in situ process which is very difficult when carried out on an industrial scale. A drawback to this kind of process is that the reaction mixture cannot properly be mixed. Hence the reagents do not properly migrate within the reaction chamber, leading to non-uniformity of reaction product. This type of process also suffers from an inability to control the rate of decomposition of —CN groups. Accordingly, the dicyandiamides, dicyanamides, diguanidines or biguanidines thus formed can undergo cracking through loss of —CN radicals.

SUMMARY OF THE INVENTION

The present invention relates to non-formaldehyde cationic or multiply cationic charged guanidine or polyguanidine products. These compounds are prepared from an inorganic ammonium salt, such as ammonium halide, ammonium sulfate, and ammonium nitrate, alkylamine optionally in the presence of urea and from a guanidine monomer selected from the following:

1. Dicyanimide and its salts (preferably, ammonium, calcium or sodium): $HN(CN)_2$
2. Guanidine: $H_2N—C(NH)—NH_2$
3. Guanidine salts: $H_2N—C(NH)—NH_2 \cdot X$ where X=HCl or HBr, acetate, carbonate, phosphate, or sulfate;
4. Biguanidine: $H_2N—C(NH)—NH—C(NH)—NH_2$
5. ($C_1$–$C_{20}$) Alkyl guanidine or biguanidine, or aryl or alkylaryl guanidine or biguanidine;
6. Dicyandiamide: $H_2N—C(NH)—NH—CN$ and sulfate or acetate salts;
7. Guanylurea: $H_2N—C(NH)—C(O)—NH_2$ (or guanyl thiourea)
8. Cyanamide: $H_2N—CN$;
9. Guanidine, biguanidine and dicyandiamide and urea (co)polymer;
10. Polycyclic guanidine (see, e.g., Re.34,486 Col.5, Line 65).

The above starting materials are reacted in a high boiling point solvent, in the presence of an amine, for example, cycloamine, aromatic amine, and hydroxyalkyl amine. The preferred amines are alkyl amines defined by the general formula:

$$H_2N(CH_2CH(Y)NH)_xH$$

wherein Y is hydrogen or lower alkyl (C1–C4) and where x is from 1 to 5.

More specifically the (co)polymer of the cyanoguanidine, dicyanimide, guanidine or biguanidine is formed with comonomers of ammonium salt, urea, and alkylamine. The most preferred comonomers are alkyl amine as exemplified by ethylenediamine, diethylenetriamine, triethylenetetramine, propylenediamine, and alkanolamines, such as methyl ethyl or butyl alkanolamine, aminotrihydroxyethylenediamine, monopropanolamine, diethanolamine crude diaminopropanol and glycolamine. The solvent is selected from high boiling point organic solvents such as a glycol, optionally in admixture with water.

Hence, the present invention describes the condensation process for preparing non-formaldehyde cationic or multiply cationic charged agents from dicyandiamide or dicyanimide, guanidine or biguanidine, or polymers or (co)polymers thereof, with amine, in the presence of ammonium chloride, ammonium bromide or ammonium iodide, ammonium sulfate, ammonium nitrate and, optionally or urea. The presence of either the ammonium salt or urea will facilitate the reaction of the —CN group of, for example, the dicyandiamide monomer without cracking, thereby giving better yield and a more uniform product.

Another aspect of the present invention is that the products prepared in accordance with this process, and even the products according to the methods of the patents described above, may be further reacted with the herein described cationic or multiply cationic charged agents, to produce desired cationic polymer or (co)polymeric material.

For Example, the amine and the polyguanidines of the prior art, (for example, U.S. Pat. Nos. 2,649,354; 3,873,266; 4,410,652; 4,439,203; 4,439,208), are suitable for reaction with chain transfer agents B(a) to B(j) shown below. U.S. Pat. Nos. 2,304,369 and 2,945,774 teach the reaction of urea with cationic or anionic coupling agents from fatty acids, diethylenetriamine, in reaction with quaternization agents. These disclosures are fully incorporated by reference. Another example is U.S. Pat. No. 4,410,652, which describes the reaction of guanidine with alkyl amine in situ at 160° C. This process is very difficult to carry out on an industrial scale, leads to the cracking and decomposition of the nitrile groups and produces an extremely viscous material, which is a nonionic product. However, such a product can be used further in the reaction of the present invention with cationic or multiply cationic charged agents. However, the products described above in the prior art patents are very sensitive to bleaching compositions and are susceptible to "bleeding" and dye discoloration.

In contrast, the cationic polyguanidine or its (co)polymer described by this invention has excellent dye fastness, improved color yield and bleaching composition with little or no dye discoloration. More particularly, the guanidine and/or polyguanidine or a co-polymer thereof is reacted from 25° C. to 195° C., preferably 35° C. to 165° C., in organic solvent or an aqueous medium or an aqueous/organic solvent system with reactive cationic or multiple cationic agents. The reactions may be carried out in the presence of a chain transfer agent, such as 2,2-sulfonyl-bis hydroxyethyl.

For PGAC (co)polymeric products the mole ratio reactantant of (I) amine derivative, (II) ammonium salt, and (III) guanidine monomer is as follows:

0.1–2.0M:0.5–2.0M:0.05–2.25M
I:II:III
molar range ratios are as follows
0.1–1.5M:0.5–2.0M:0.15–2.5M:0.25–1.5M
I:II:III:IV,
where IV is urea.

The general reaction can be written as follows:

Cyanoguanidine/or guanidine derivative+ammonium salt+alkyl amine+solvent→polymer/or (co)polymer+DEG+water→aqueous (co)polymer, where DEG is diethylene glycol.
More preferably, the reactant side of the reaction scheme is as follows:

Cyanoguanidine + Ammonium chloride +

(DCDA)    (NH₄Cl)

diethylenetriamine + diethyleneglycol (DETA)    (DEG)

The guanidine, polyguanidine or (co)polyguanidine are formed at pH 4.0 to 11.0 in either free or salts form. These are further reacted with cationic or multiply cationic chain transfer agents. Representative chain transfer agents useful in the practice of the invention have present a substituent which is a halo atom (chlorine, bromine, iodine), a sulfate group substituted with methyl or ethyl, methoxy, or ethoxy, or a nitrate anion present. Compounds B(a)–B(I) are suitable chain transfer agents in the practice of this invention:

B(a): [Cl—CH2—CH(OH)—CH2—N(+)(CH3)3]Cl(−)]
or (C6H15NOCl);

B(b): [CH2——CH—CH2—N(+)(CH3)3]Cl(−)]
      \  /
       O
or (C6H14NOCl);

B(c): [Cl—CH2—CH(OH)—CH2—N(+)(CH3)2—CH2—CH(OH)—CH2—
Cl(−)

-continued

—N(+)(CH3)2—CH2—CH(OH)CH2Cl]
Cl(−)
or (C12H28N2O3Cl4);

B(d): [Cl—CH2—CH(OH)—CH2—N(+)(CH3)2—[CH2—CH(OH)—CH2—N(+)(CH3)2—]$_n$—
(Cl−) (Cl−)
—CH2CH(OH)—CH2Cl]

B(e): [CH2——CH—CH2—N(+)(CH3)2—CH2—CH2—N(+)(CH3)2—CH2—CH——CH2]
\\O/ (Cl−) (Cl−) \\O/
or (C12H26N2O2Cl2);

B(f): [Cl—CH2—CH(OH)—CH2—N(+)(CH3)2—(CH2)6—N(+)(CH3)2—CH2—CH(OH)—Cl]
(SO4$^{2-}$)/or 2Cl−
or (C15H34N2O6Cl(2)S) or (C15H34N2O2Cl(4))

B(g): [Cl—CH2—CH(OH)—CH2—N(+)(CH3)2—NH—C(O)—NH—N(+)(CH3)2—
(Cl−) (Cl−)
—CH2—CH(OH)—CH2—Cl]
or (C11H26N4O3Cl4);

B(h): [CH2——CH—CH2—N(+)(CH3)2—NH—C(O)—NH—N(+)(CH3)2—CH2—CH—CH2]
\\O/ (Cl−) (Cl−)
or (C11H24N4O3Cl(2));

B(i): N,N,N,N'N'N'-hexaalkyl-B-hydroxy-trimethylene diammonium halide
(R)3—N(+)—CH2—CH(OH)—CH2—N(+)(R')3
X(−)    X(−)

where: R is $C_1$–$C_4$ alkyl

R is alkyl or alkylene-alkyl having C1–C3 atoms and

X is selected from the group the consisting of chloride, bromide or iodide;

B(j): (tetrakis-hydroxymethyl)-phosphonium halide, hydroxide, oxalate, acetate, sulfate, or phosphate);

B(k): 2,2-sulfonyl-hydroxyethyl;

B(l) a mixture of any of (a) through (k), as illustrated, for example, in Re.34,486 Example Nos. 15A, 16A, No.29–44 (steps 1 to 7).

Thus, first ammonium halide, sulfate or nitrate, is reacted with one of dicyandiamide or dicyanimite or biguanidine, at 65°–195° C. to form a polyguanidine cation ammonium salt which will further react with alkylamine to generate the desired polymer or (co)polymer. This reaction can be written as follows:

H2N—C(NH)—NH—CN + NH4Cl + H2N(CH2CH2N)$_n$H +
(DCDA)                    (DETA)

H2O/DEG ——> [—H2N—C(NH)—NH—C(NH)—NH2+Cl] +

(H2N—CH2CH2)2NH ——>

[—HN—C—NH—C—NH—(CH2CH2—NH)2]$_m$
      ‖       ‖
    NH2+Cl−  NH2+Cl−

The reaction is carried out at from 110° to 200° C., and preferably from 110° to 165° C. forming the polyguanidine or (co)polyguanidine of the formula

[—HN—C(NH)—NH—C(NH)—NH—R—]$_m$, where R represents H or (C1–C4) alkyl, optionally interrupted by oxygen, sulfur or nitrogen; R may also incorporate a saturated or unsaturated cyclic hydrocarbon nuclei in which the total number of carbon atoms directly interposed between the pair of nitrogen atoms linked between guanidine radicals and amine radicals used and R is more than 1 and less than 500;

m is less than 100,000.

The PGUAC-type addition to the (co)polyguanidine according to the invention has the following structure:

[—NH—C(NH)—N—C(NH)—NH—R—]$_n$
              |
              C=O
              |
[—NH—C(NH)—N—C(NH)—NH—R—]$_{n_5}$ where R is as previously defined and n is from 1 to 5.

Secondly, the polyguanidines and (co)polyguanidines are reacted with cationic or multiply cationic charged agents to form improved non-formaldehyde cationic polymeric materials. The new non-formaldehyde improved cationic charged guanidine or polyguanidine according to the invention or its (co)polymer may have the following structures:

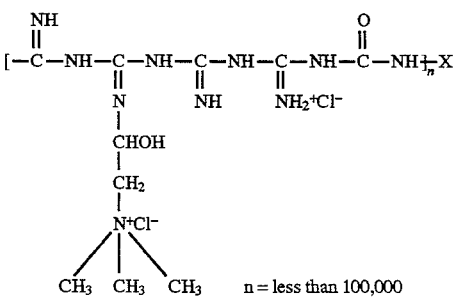

n = less than 100,000 or:

-continued

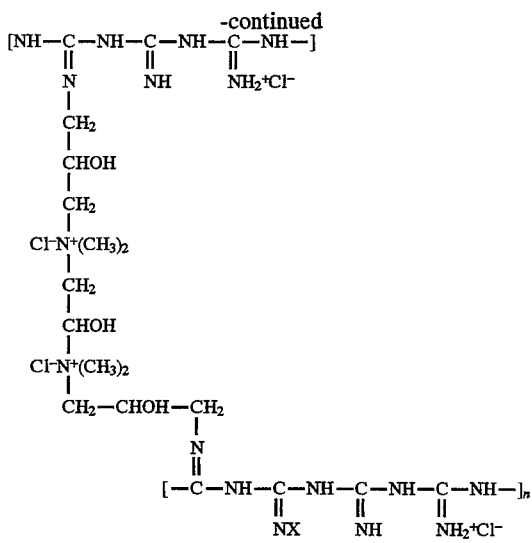

where n is less than 100,000 and X is either —H, —CN, —NH(CN), $NH_2$—C(NH)—, —C(O)—$NH_2$.

The products according to the invention have utility as flame retardants, dispersing agents, antistatic agents, paper sizing, as pitch control agents, in felt cleaner compositions, antimicrobial, precipitant and flocculating agents. The cationic or multiply cationic charged polyguanideines may also be used in combination with a sequestering agent such as a phosphonic acid or an aminotricarboxylic acid. The following non-limiting examples demonstrate various aspects of the invention, namely, polymeric and copolymeric products, their preparation and their utility. All parts and percentages are by weight and temperature is expressed in degrees Centigrade.

Example No. 1

A 500 ml resin kettle flask was equipped with a condenser, a mechanical stirrer, and a thermometer. To the flask was added diethylene triamine (71.71 g, 0.695 mole). The triamine was heated to 55°–60° with stirring, followed by the addition of ammonium chloride (44.88 g, 0.824 mole), added gradually over 20 minutes. The mixture was heated up to 95°–100° and then mixed for 15 minutes. Diethylene glycol (12.99 g) was then added and the reaction temperature brought to a range of 95°–105° until the reaction mixture was clear. Dicyandiamide (DCDA) (76.29 g, 0.908 mole) was added gradually as 10 portions over 50 minutes and the reaction was maintained at the prevailing temperature for 15 minutes. Gradually the reactor temperature was increased at a rate of 4°–5°/min. until reaching 195° according to the following protocol: upon reaching 165°–170°, the reaction was maintained within this temperature range for 2 hours; upon reaching 180°–195°, the reaction was maintained for an additional 2 hours. The reactor was cooled to 95°–100°, followed by the addition of hot water (50°–95° C.) (100.00 g) in two equal portions. The reaction medium was stirred until a uniform solution was obtained. The product obtained had the following physical and chemical properties:

Appearance: yellow to light yellow
Sp. Gravity: 1.15–1.24 g/ml
10% pH (as is): 8.50–9.0
Viscosity (c.p.s.)(at 16°): 275–500 cps
(LVF, spindle #2, 60 rpm).

Example No. 2

Example No. 1 was repeated using the quantities of reactants previously specified according to the following general procedure. Diethylene triamine was charged to the reaction vessel. With stirring, ammonium chloride was added gradually in 14 portions at room temperature. Over approximately 0.5 hr., the mixture was heated to 90°–95°. Diethylene glycol was added slowly to the stirring mixture and the reaction temperatures was maintained until a clear solution developed. DCDA was added in 10 portions over 50 minutes, and the reaction mixture was stirred for 15 min. at 95°–105°. The temperature was raised to 170°–180° over 50 min. and maintained for 2 hrs. The reaction temperature was again raised to 185°–190° over 1 hr. The reactor was then cooled to 100°, followed by the addition of hot water as previously indicated in Example No. 1, with stirring until a clear solution was obtained. No filtration was required.

The product obtained has the following physical and chemical properties:

Appearance: deep yellow viscous solution
10% pH: 8.50–8.90
Sp. Gravity: 1.16–1.22 g/ml
Viscosity: 167.5–200 cps
(LVF, spindle #2, 60 rpm;)

Example No. 3

The embodiment of the invention pertaining to PGUAC products in addition to is now demonstrated. The resin kettle flask was equipped with a magnetic stirrer and a condenser as in the previous examples.

Diethylene triamine (71.73 g, 0.695 mole) was heated to 60°–65° with stirring. Urea (12.36 g, 0.206 mole) ammonium chloride (44.88 g) were added in 4 portions, and if necessary raising the temperature of the vessel was increased to 90°–95° over approximately 25 min. Diethylene glycol (20.00 g) was added while the temperature was maintained at 90°–95° for 15 min. DCDA (76.29 g, 0.908 mole) was added gradually (approx. 20 g. at a time) while the temperature was increased and then held in the range of 95°–105°. The reaction temperature was then raised in increments of 3°/min until reaching 180°–190°, where the reaction was held for 2 hrs. The flask contents, now a viscous liquid, were cooled to 100°, followed by the addition of hot water (in two 50 g. portions) and mixing until a homogeneous solution was obtained.

The product obtained had the following physical and chemical properties:

Appearance: deep yellow semi-viscous liquid
pH (as is): 11.0–11.5
pH (10% aqua sol.): 10.82–11.06
Sp. Gravity: 1.15–1.20 g/ml
Viscosity: 20–150 cps
(LVF, spindle #2, 60 rpm;)

Example No. 4

Reaction of Polyguanidine with Chain Transfer Agent

Using the reactor of the type in Example No. 1, 0.1 mole of the product of Example No. 1 was charged to the reactor with stirring. The reactor was heated to 65°–70°. Chain transfer agent B(a) (0.1 mole) was added and the reaction was stirred for 1 hr, followed by cooling to room temperature. The copolymeric product obtained had the following physical and chemical characteristics:

Appearance: Light to deep yellow color
Sp. Gravity: 1.15–1.20 g/ml

Viscosity:

(LVF,spd.#2,60 rpm): 50 to 250 cps.

10% aq.sol. pH: 6.5–8.0

To further exemplify and demonstrate the improved characteristics of the new polymeric materials of this invention, numerous tests were conducted. The test procedures and their results are set forth in the following description and in the accompanying Tables below.

TEST-I

The following results demonstrate the characteristic of the inventive cationic polyguanidine copolymers. Effluent waste water from a paper mill plant having a turbidity over 900 NTU was treated with 200 milligrams of each of the below-specified agents per liter, pH=7.5. The results were as follows:

| Product | Turbidity before treatment (NTU) | Turbidity after Treatment (NTU) No pH Adjustment |
|---|---|---|
| Original water control | 925 | |
| Example No. 1 | | 4.65 |
| Example No. 4 | | 3.75 |
| Fr. PAT. 2567897 | | |
| Example 1 | | 10.75 |
| PAT 'Re 34,486 | | |
| Example No. 15 | | 5.35 |

TEST-II

A staple fiber fabric, dyed with 3% Brilliant-Benzo-Fast-Violet BL, was impregnated with the aqueous solution described in Example 4. The fabric was then squeezed until its increase in weight was 100% by weight, followed by drying at 80°–100° C. and heating to 150° C. for 5 minutes. The dried fabric was soaped at 90° C. for 30 minutes, then rinsed and dried. The fabric had excellent fastness to washing.

Comparative Test-II

TEST-II was repeating by substituting the product of Example 4 with product No. 1 (Example No. 1) of Fr. Pat '897. The fabric had good fastness to washing.

TEST-III

Good dye fastness and bleaching resistance were observed when cotton cloth dyed with 2% C. I. Direct Violet was first soaked in a 0.5% aqueous solution of the product of Example No.4 at 45° for 20 minutes. The cloth was then treated at 70° C. for 10 minutes with a 0.3% aqueous solution of a bleaching composition containing bleaching agent (Sodium Perporate) (50 parts), Sodium Carbonate (10 parts), sodium sulfate (35 parts), and the product of Example No.4 (5 parts).

Comparative Test-III

The procedure of TEST-III was repeated except that the product of inventive Example No.4 was replaced with product No. 1 (Example No. 1) of Fr. PAT '897. The resultant dye was not bleach resistant, i.e., the color bled out of the fabric.

TEST-IV

The cationic polyguanidine (co)polymers of the present invention may be modified, having up to 25 percent in a form of other form of salts like chloride or sulfate, acetate and formate. For example, viscose rayon fibers were treated with an 2% aqueous solution of the product of No. 1 Example No.1 as a in sulfate salt at pH 9.0–9.5 and was then washed. The fiber was treated with an aqueous solution containing 37.5% copper sulfate and 33.5% sodium thiosulfate for 30 minutes at 80° C., washed and dried to give a fiber with surface resistivity 18 ohmi.

TEST-V

A). A filter paper was impregnated with solution of the product of Example No. 1, dried and cured in an oven. The paper was flame retardant with very low smoking properties.

B) TEST-V was repeated using a fabric "COTTON PRINT CLOTH STYLE 400" and 44.

The fabric was padded to about 75% wet pick-up, dried on a center frame and cured in an oven. The fabric exhibited flame retardant properties.

C). TEST-V (B) was repeated using a conventional formulation for the finish as follows:

| Component | % in Padding Liquor |
|---|---|
| Polymer of Example No. 1 | 30 |
| Trimethylolmelamine | 8 |
| Urea | 5 |
| NaOH | 2.5 |
| Softener | 1.0 |
| Wetting Agent | 0.1 |

The fabric was padded to about 75% wet pick-up, dried on a center frame and cured in a oven for 2 minutes at 160° C. Very good fire retardance was obtained with low smoking properties.

Although the invention has been described with respect to the preferred embodiments, it is not intended that the innovation to be so limited as there are numerous modifications and expansions that may be made and that are readily appreciated by those skilled in the art in view of the embodiments shown and, in keeping with the spirit and scope of the present invention.

What is claimed is:

1. A water soluble organic polymer having a high nitrogen content, obtained by reacting:

(a) 0.05–2.25 mole of monomers selected from the group consisting of dicyandiamide (DCDA), dicyanimide (DCDI), guanidine, guanidine substituted with ($C_{1-20}$ alkyl), aryl, or alkaryl, biguanidine, biguanidine substituted with ($C_{1-20}$ alkyl), aryl, or alkaryl, guanylurea, guanylthiourea, cyanamide, salts thereof, and mixtures thereof with, (b) 0.5–2.0 mole of inorganic ammonium salt comprising ammonium chloride, ammonium bromide, ammonium sulfate and ammonium nitrate, further reacted with (c) 0.1–2.0 mole of an amine selected from the group consisting of primary and secondary (C1–C10) alkyl amine, (C2–C6) alkylene diamines and polyalkylene polyamines of the structure

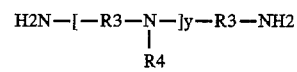

wherein y represents an integer of about 1 to 5, each R3 is individually alkylene of 1 to 6 carbon atoms and R4 is selected from the group consisting of hydrogen, hydroxy (C1–C3) alkyl and (C1–C3) alkyl, and optionally in the presence of urea at a temperature ranging from 25° C. to 195° C. in the presence of a high boiling point organic solvent comprising one of diethylene glycol and propylene glycol which is optionally admixed with water.

2. The product according to claim 1, wherein reactant (a) is selected from the group consisting of dicyanimide (DCDI) and its ammonium, calcium or sodium salts, dicyandiamide (DCDA), guanidine, biguanidine, guanylurea, cyanamide, ($C_1$–$C_{20}$) alkylguanidine or ($C_1$–$C_{20}$) alkylbiguanidine, or mixtures thereof.

3. The product according to claim 1, wherein reactant (c) is a primary or secondary (C1–C10) alkyl amine.

4. The product according to claim 1, wherein reactant (b) is an inorganic ammonium salt selected from the group consisting of ammonium chloride, ammonium bromide, ammonium iodide, ammonium sulfate, ammonium nitrate, and mixtures thereof.

5. The product according to claim 1, wherein reactant (c) is selected from the group consisting of straight chain alkylene amine of the general formulae:

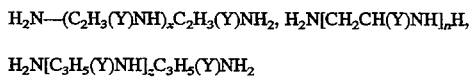

wherein x is from 1 to 4, n is 1 to 5, and Y is hydrogen or $C_1$–$C_4$ alkyl, and z is 1 or 2; methylenediamine, diethylenetriamine, triethylenetetramine, propylenediamine; aminotrihydroxyethylene diamine, polyethylenepolyamine, diethanolamine, diaminopropanol, glycolamine, methyl, ethyl and butyl alkanolamine; $C_1$–$C_4$ alkyl or hydroxy ($C_1$–$C_6$) alkyl substituted 1,2-ethylene, 1,3-propylene or 1,3-(2-hydroxypropylene); and mixtures thereof.

6. A polymeric product according to claim 5, wherein said ammonium salt is ammonium chloride, ammonium bromide, or an admixture thereof.

7. The product according to claim 1 wherein the reaction of co-reactants (a), (b) and (c) produces a polycondensation product that is cationic or cationic-nonionic.

8. The product according to claim 1, wherein dicyandiamide (DCDA), (reactant (a)) reacts with ammonium chloride (reactant (b)) to convert cyano groups (—CN) to imino groups.

9. The product according to claim 8, which is further reacted with an alkylamine or an alkanolamines selected from the group consisting of methylenediamine, diethylenetriamine, triethylenetetramine, tetraethylenepentamine, propylenediamine, diethanolamine, diaminopropanol, glycolamine, 1,3-(2-hydroxypropylene), isopropanolamine, diisopropanolamine, tetraethylenepentamine, N-aminoethylethanolamine, N-2-hydroxyethyldiethylenetriamine and N-2-hydroxypropylethylenediamine.

10. The product according to claim 8, wherein formation of imino groups proceeds at a temperature of from 20° to 110° C. for 0.25 to 2.0 hours.

11. The product according to claim 10, wherein the formation of imino groups proceeds between 80° to 110° C.

12. The product according to claim 9, wherein the polymeric material is formed at a reaction temperature between 95° to 195° C.

13. The product according to claim 12, wherein the reaction temperature is between 95° to 165° C.

14. The product according to claim 1 in combination with a sequestering agent.

15. A water soluble organic polymer having a high nitrogen content, obtained under reflux conditions with stirring, comprising the steps of
   a) heating 0.1–2.0 mole of an amine selected from the group consisting of primary and secondary (C1–C10) alkyl amine, (C2–C6) alkylene diamines and polyalkylene polyamines of the structure

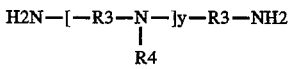

wherein y represents an integer of about 1 to 5, each R3 is individually alkylene of 1 to 6 carbon atoms and R4 is selected from the group consisting of hydrogen, hydroxy (C1–C3) alkyl and (C1–C3) alkyl, to 35°–65° C.;
   b) adding gradually to said alkylamine, 0.5–2.0 mole of inorganic ammonium salt comprising ammonium chloride, ammonium bromide, ammonium sulfate and ammonium nitrate;
   c) heating said alkylamine and inorganic ammonium salt to about 100° C.;
   d) adding a glycol solvent comprising one of diethylene glycol and propylene glycol, optionally admixed with water, and heating to obtain a clear solution;
   e) gradually adding to said clear solution obtained in d) 0.05–2.25 mole of monomers selected from the group consisting of dicyandiamide (DCDA), dicyanimide (DCDI), guanidine, guanidine substituted with ($C_{1-20}$ alkyl), aryl, or alkaryl, biguanidine, biguanidine substituted with ($C_{1-20}$ alkyl), aryl, or alkaryl, guanylurea, guanylthiourea, cyanamide, salts thereof, and mixtures thereof to produce a reaction mixture;
   f) gradually heating said reaction mixture over a period from about 12 to 32 hours to a temperature of 160°–195° C.;
   g) maintaining reaction temperature for about 2 hours;
   h) cooling said reaction mixture to about 100° C.; and
   i) adding water to obtain a homogeneous solution.

16. The water soluble organic polymer according to claim 15, further comprising adding urea with said inorganic ammonium salt in step b).

* * * * *